US005689700A

United States Patent [19]
Miller et al.

[11] Patent Number: 5,689,700
[45] Date of Patent: Nov. 18, 1997

[54] UNIFICATION OF DIRECTORY SERVICE WITH FILE SYSTEM SERVICES

[75] Inventors: Arnold Miller; Yuval Neeman, both of Bellevue; Aaron M. Contorer, Kirkland; Pradyumna K. Misra, Issaquah; Michael R. C. Seaman, Kirkland; Darryl E. Rubin, Redmond, all of Wash.

[73] Assignee: Microsoft Corporation, Redmond, Wash.

[21] Appl. No.: 175,063

[22] Filed: Dec. 29, 1993

[51] Int. Cl.$^6$ ............................................. G06F 12/00
[52] U.S. Cl. ............................................. 395/610
[58] Field of Search ................ 395/650, 610–616, 395/200.01, 200.05, 200.09, 200.15

[56] References Cited

U.S. PATENT DOCUMENTS

| | | | |
|---|---|---|---|
| 4,914,571 | 4/1990 | Baratz et al. | 364/DIG. 1 |
| 5,345,586 | 9/1994 | Hamala et al. | 364/DIG. 1 |
| 5,434,974 | 7/1995 | Loucks et al. | 364/DIG. 1 |
| 5,497,463 | 3/1996 | Stein et al. | 395/200.03 |

FOREIGN PATENT DOCUMENTS 0 278 472  8/1988  European Pat. Off. .......... G06F 9/46

OTHER PUBLICATIONS

Ebrahimi et al., "File Name Mapping Permitting Network Location Transparency", IBM Tech. Discl. Bull. vol. 26, No. 7B, Dec. 1983, pp. 3791–3794.

"File Name Mapping Method Permitting Network Location Transpaency," *IBM Technical Disclosure Bulletin*, vol. 26(7B): 3791–3794, Dec., 1983.

Satyanarayanan, Mahadev, "Scalable, Secure, and Highly Available Distributed File Access," *Computer*, vol. 23(5): 9–20, May, 1990.

Yeo, A. K. et al., "A Taxonomy of issues in Name Systems Design and Implementation", *Operating Systems Review*, vol. 27(3): 4–18, Jul. 1993.

"DCE Application Development Guide"; *Open Software Foundation*; Dec. 27, 1991; Chapter 22, pp. 1 to 5, and Chapter 24, pp. 1 to 4.

"Directory Services for a Distributed Computing Environment"; *Open Software Foundation*; Apr. 1991; pp. 1–10.

"Netware 4.0: A Directory to the Enterprise"; *Data Communications*; Sep. 21, 1992; pp. 53–60.

Jim Brown and Stephen Mattin; "NetWare users getting directory assistance"; *Network World*; May 3, 1993; pp. 40–42.

Gary Hawkins; "Netware 4.0 Directory Services"; *Enterprise Computing*; May 17, 1993; pp. 49–52.

Michael Day; "Network Directory Services: Major Technology Behind 4.0"; *LAN Times Special Report/Netware 4.0*; May 10, 1993; pp. 60–61.

"Banyan works out with Vines 5.50: Banyan raises the bar for directory services"; *LAN Magazine*; vol. 8, No. 4; Apr. 1993; p. 12(2).

George F. Couloris and Jean Dollimore; "Grapevine: An Exercice in Distributed Computing"; *Distributed Systems: Concepts and Design*; 1988; pp. 322–347.

Hal Stern; "Managing NFS and NIS"; *O'Reilly & Associates, Inc.*; Chapters 5 and 6; 1991; pp. 89–137.

"Data Communication Networks Directory"; *The International Telegraph and Telephone Consultative Committee*; vol. VIII; Nov., 1988; pp. 3–48.

*Primary Examiner*—Thomas M. Heckler
*Attorney, Agent, or Firm*—Seed and Berry LLP

[57] ABSTRACT

A software system unifies directory services with the file system. Directory service entries and other files are all stored in a common logical format, such as an object format. The unification of files with directory service entries allows a common set of tools to operate on both such entities and allows a common name space to be utilized. Security measures are taken so as to prevent unauthorized access to the directory service entries.

20 Claims, 10 Drawing Sheets

UNIFICATION OF DIRECTORY SERVICE WITH FILE SYSTEM SERVICES

TECHNICAL FIELD

The present invention relates generally to data processing systems and, more particularly, to unification of directory service with file system services.

BACKGROUND OF THE INVENTION

Conventional operating systems typically have provided file system services and directory service in independent subsystems. Each of the subsystems has required a separate set of tools and a separate name space. As a result, the overhead for maintaining these separate subsystems has been quite large.

SUMMARY OF THE INVENTION

The limitations of the prior art are overcome by the present invention. In accordance with one aspect of the present invention a distributed system has components including at least one storage device. A method is practiced in this distributed system wherein files are stored in the storage devices in logical structures of a particular kind. Directory entries are also stored in the storage devices in logical structures of the same kind as the logical structures that store the files. At least some of the directory entries hold information regarding how to locate the logical structures in the distributed system. A first of the logical structures is accessed through the storage device. The first of the logical structures stores at least one directory entry and the information stored therein is used to locate a second of the logical structures.

DETAILED DESCRIPTION OF THE INVENTION

The preferred embodiment of the present invention unifies directory service with the file system. In the preferred embodiment of the present invention, directory service entries and other kinds of files are all "objects" that share a distributed name space and that are manipulated by the same (APIs) application program interfaces. The preferred embodiment of the present invention provides measures for resolving the security issues created by treating both files and directory service entries as objects. Directory services entries are stored in the name space of the file system and provide the name service for the file system.

As mentioned above, the preferred embodiment of the present invention treats directory service entries as well as other files in the system as objects. Nevertheless, those skilled in the art will appreciate that the present invention need not be practiced in an object-oriented environment. In alternative embodiments of the present invention, directory service entries may be treated as files (like other files in the system) rather than as objects.

Figure 1:
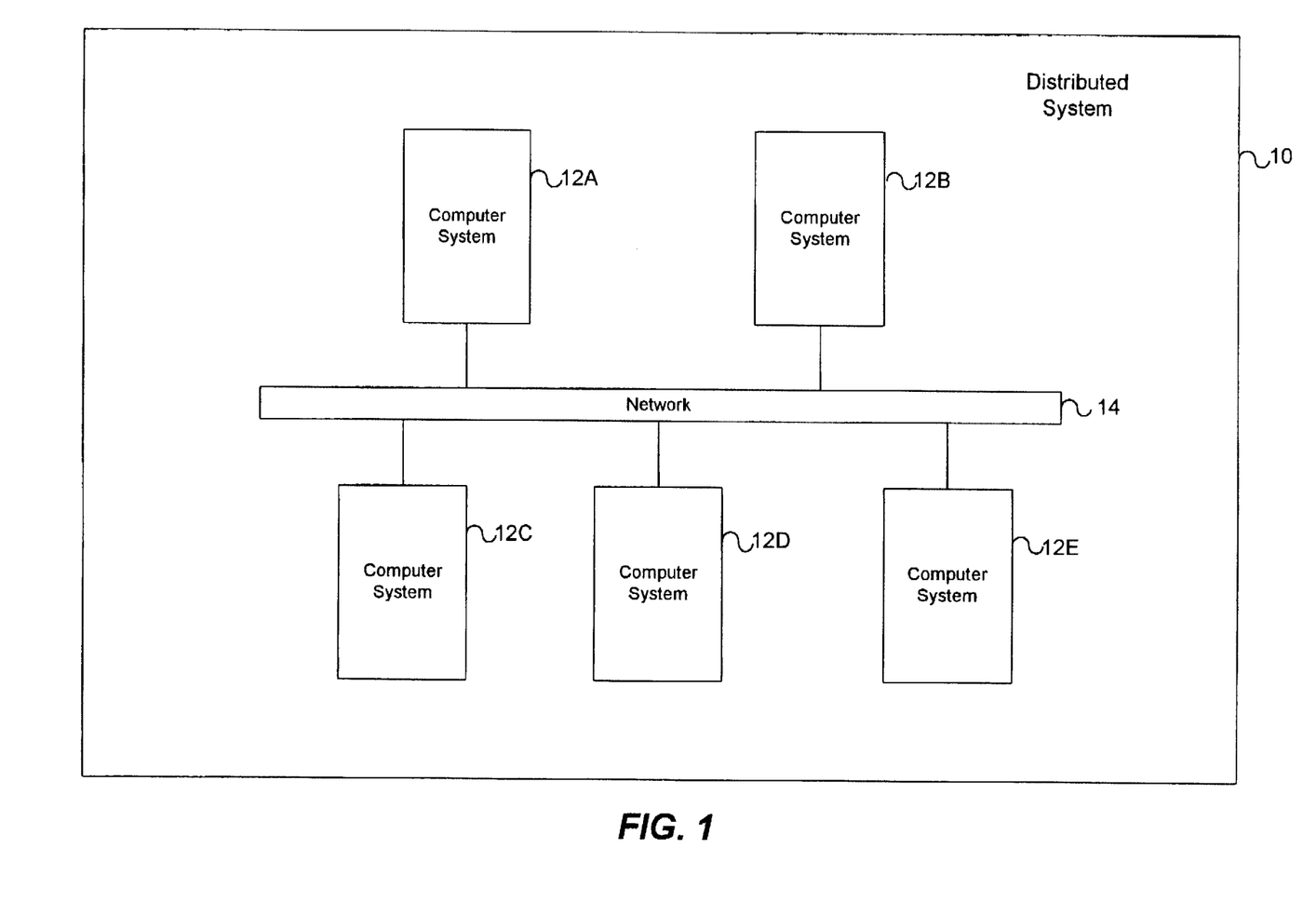
FIG. 1 is a block diagram of a distributed system for practicing a preferred embodiment of the present invention.

FIG. 1 is a block diagram of a distributed system 10 for practicing the preferred embodiment of the present invention. Those skilled in the art will appreciate that the distributed system 10 shown in FIG. 1 is merely illustrative and that other distributed systems may be used for practicing the present invention. Further, the present invention may also be practiced in a single processor system. The distributed system 10 includes computer systems 12A, 12B, 12C, 12D and 12E. The computer systems 12A, 12B, 12C, 12D and 12E are interconnected by a network 14, such as a local area network (LAN).

Figure 2:
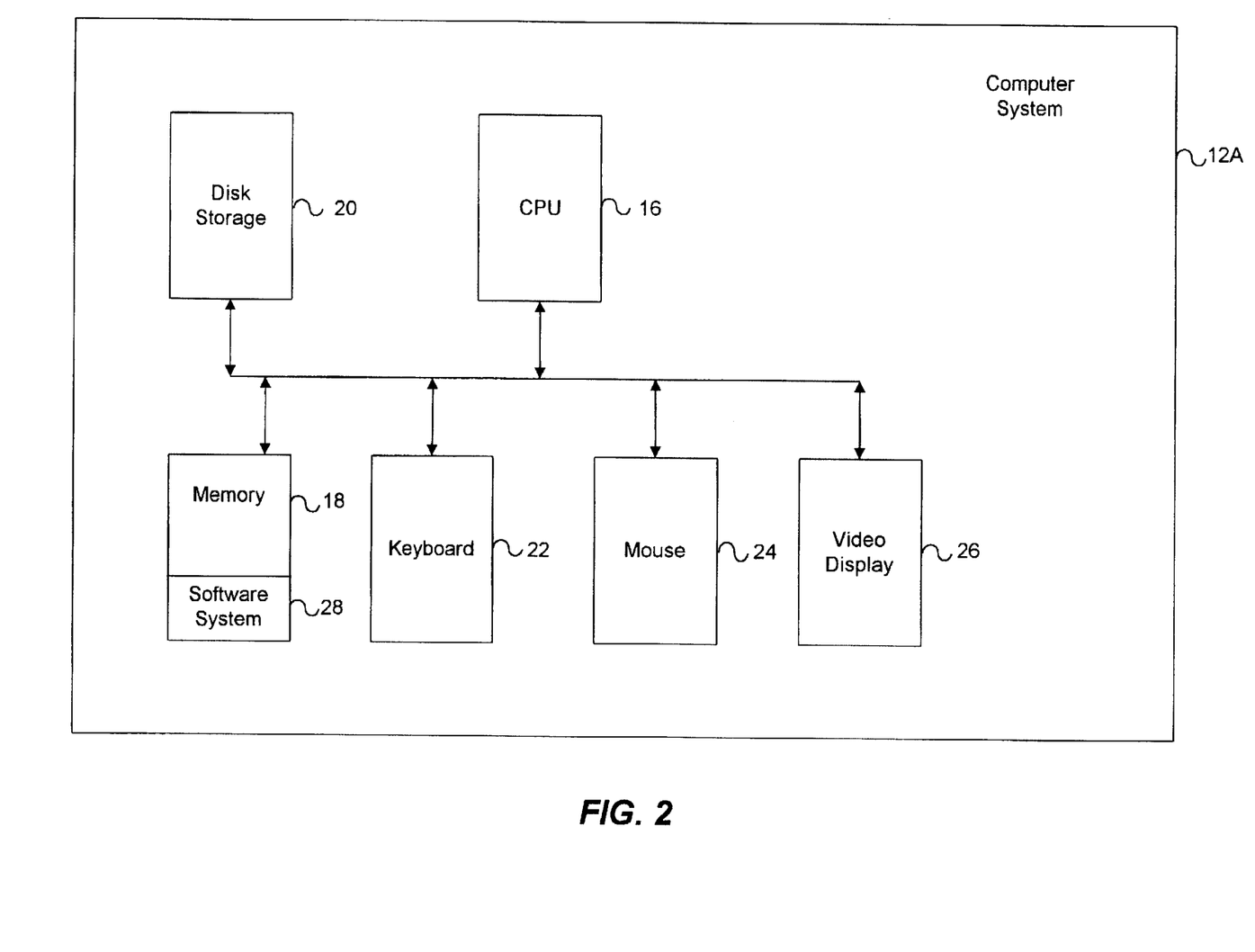
FIG. 2 is a more detailed block diagram of a computer system for the distributed system of FIG. 1.

FIG. 2 is a block diagram that shows the computer system 12A in more detail. The other computer systems 12B, 12C, 12D and 12E need not have the same configuration as computer system 12A. Computer system 12A includes a central processing unit (CPU) 16 that has access to memory 18 and disk storage 20. In addition, computer system 12A includes a number of input/output devices, such as keyboard 22, mouse 24 and video display 26. It should be appreciated that the components of the computer system 12A shown in FIG. 2 are merely illustrative and that other components may alternatively be employed.

The memory 18 of the computer system 12A holds a copy of an object-oriented software system 28. Computer systems 12B, 12C, 12D and 12E (FIG. 1), likewise, may also hold a copy of this object-oriented software system 28 (although all of the computer systems need not hold a copy of the object-oriented software system). The unification of the directory service with the file system is realized through the object-oriented software system 28. The object-oriented software system 28 includes the file system, the directory services and a security system. The file system is described in more detail in co-pending patent application entitled, "Distributed File System," Ser. No. 08/174,919, now U.S. Pat. No. 5,519,855, which is assigned to a common assignee, the contents of which are explicitly incorporated by reference herein.

In order to fully understand the preferred embodiment of the present invention, it is helpful to first review certain concepts. One such concept is the concept of an "object". An object is a logical structure that includes data structures for holding data and may include functions that operate on the data held in the data structures. An object may hold just data (such as property information) and not include code for manipulating the data. An object is a useful structure for encapsulating file data and file behavior into a single logical entity. In the preferred embodiment of the present invention, the data structures of objects hold properties or property sets.

Objects are organized into "classes". An object class is a group of objects with similar properties and common behavior. Each object is a member of a class and constitutes an instance of the object class. All members of a class include at least the properties defined for the object class, but the value of these properties may vary among the objects of the object class. Directory service entries are distinguished from other objects in the system 10 by their class.

Another concept exploited in the preferred embodiment of the present invention is the notion of an "interface". An interface is a named set of logically related functions. An interface lists signatures (such as parameters) for a set of functions. An interface does not provide code for implementing the functions; rather, the code for implementing the functions is provided by objects. Objects that provide the code for implementing the functions of an interface are said to "support" the interface. The code provided by an object that supports an interface must comply with the signatures provided within the interface. In the C++ programming language, an interface constitutes a set of virtual functions.

Figure 3:
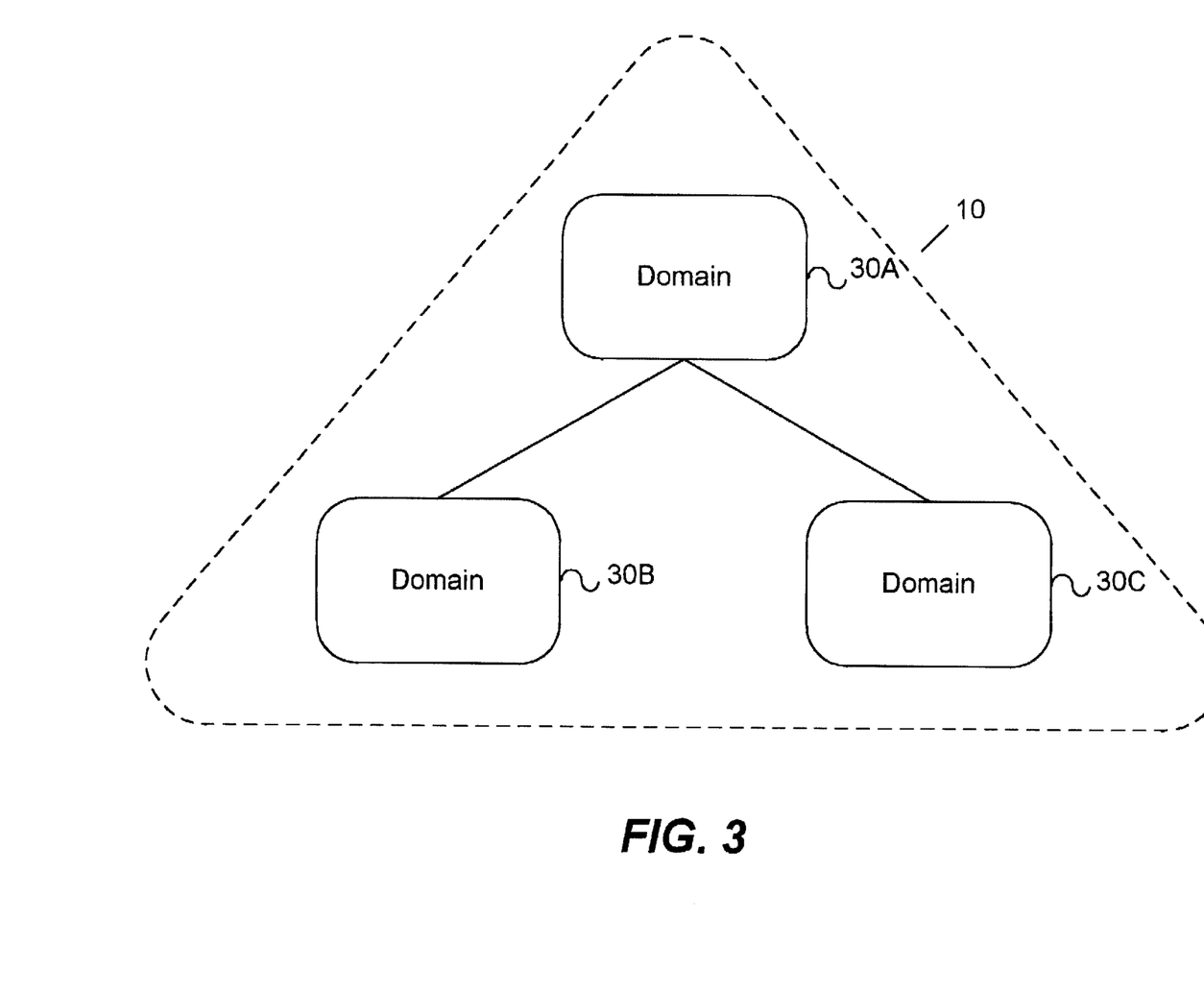
FIG. 3 is an illustrative diagram of a distributed system that is partitioned into domains in accordance with the preferred embodiment of the present invention.

A number of additional concepts needs to be discussed to understand the preferred embodiment of the present invention. These concepts relate to an administrative model adopted by the preferred embodiment of the present invention. In this administrative model, the distributed system 10 is logically partitioned into a number of "domains." A domain is a self-sufficient collection of resources that includes users, services, objects, and machines. FIG. 3 shows a simplified example of a distributed system that has only three domains 30A, 30B, and 30C. Domains are provided to facilitate scaling (i.e., adding new resources to the system) and encapsulation of resources into a logical unit within the distributed system. A domain is viewed as a single entity for purposes of administration, naming, and security. Each domain implements its own administrative and security policies. The encapsulation of resources allows a domain to act autonomously relative to other domains.

Figure 4:
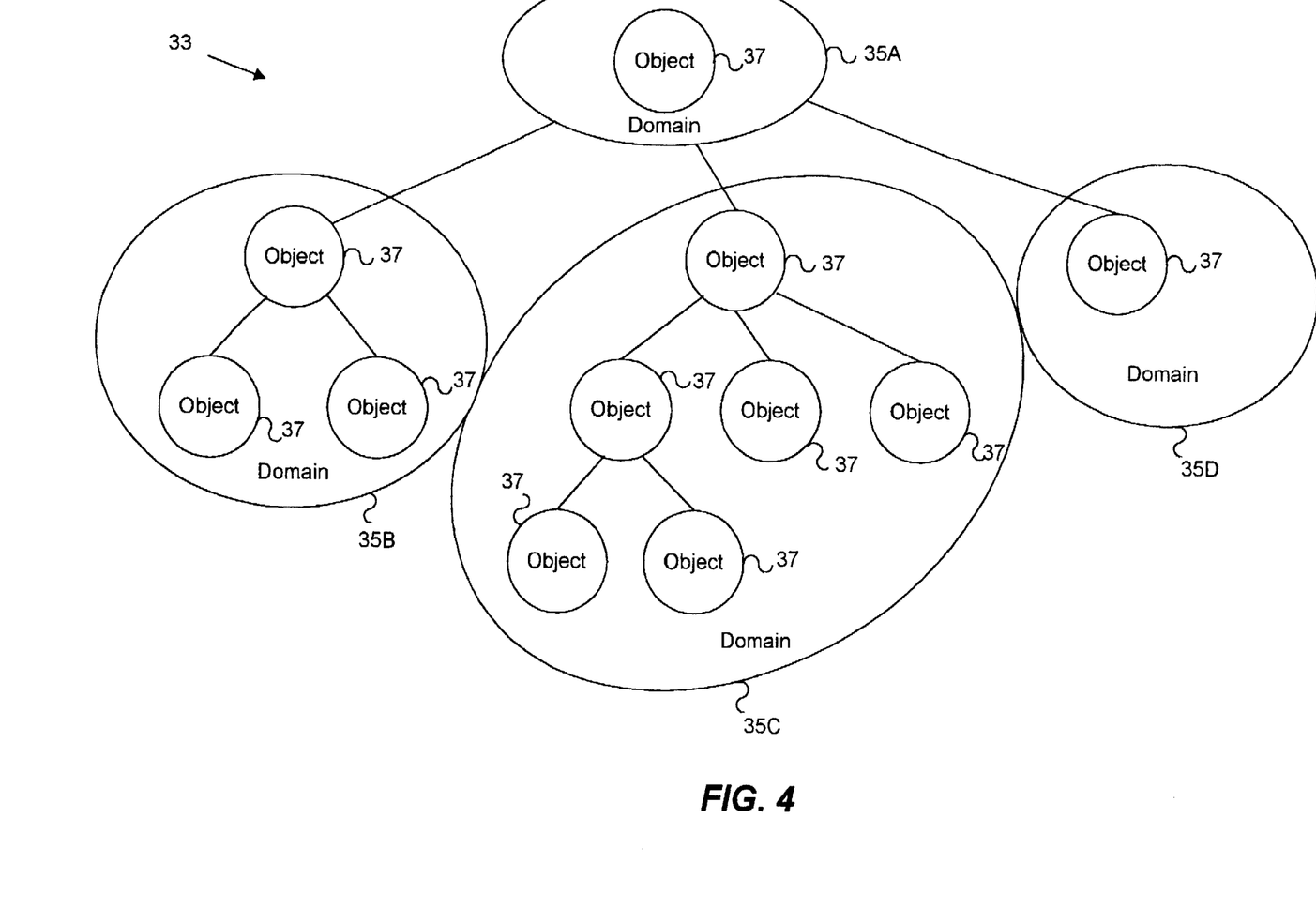
FIG. 4 is an illustrative diagram of a distributed name space in accordance with the preferred embodiment of the present invention.

From the above description, it is apparent that a number of objects are present throughout the distributed system 10. FIG. 4 shows an example of a distributed name space 28. This diagram should not be confused with FIG. 3, which is intended to show components of the distributed system 10. The distributed name space 33 is a logical tree-like structure. The distributed name space includes the names of objects 37 that are part of respective domains 35A, 35B, 35C and 35D. The set of objects in each domain represent a separate domain name space that is a sub-tree of the distributed name space 33.

A "volume" is a file system construct that is a logical partition of the objects stored by the system. Each volume holds a group of objects. Each volume has a volume object associated with it. The volume object relates a path name to an actual volume. Each domain has its own volume objects that define the name space that is local to the domain (i.e., what volumes are local to the domain).

Each volume object stores an entry path of the volume (i.e., the logical path name for the root of the name space of the volume). In addition, each volume object stores entry paths for other volumes in the same domain as well as entry paths for immediately superior and subordinate domains. The entry paths are useful in traversing the name space of the volume and adjacent volumes.

Figure 5:
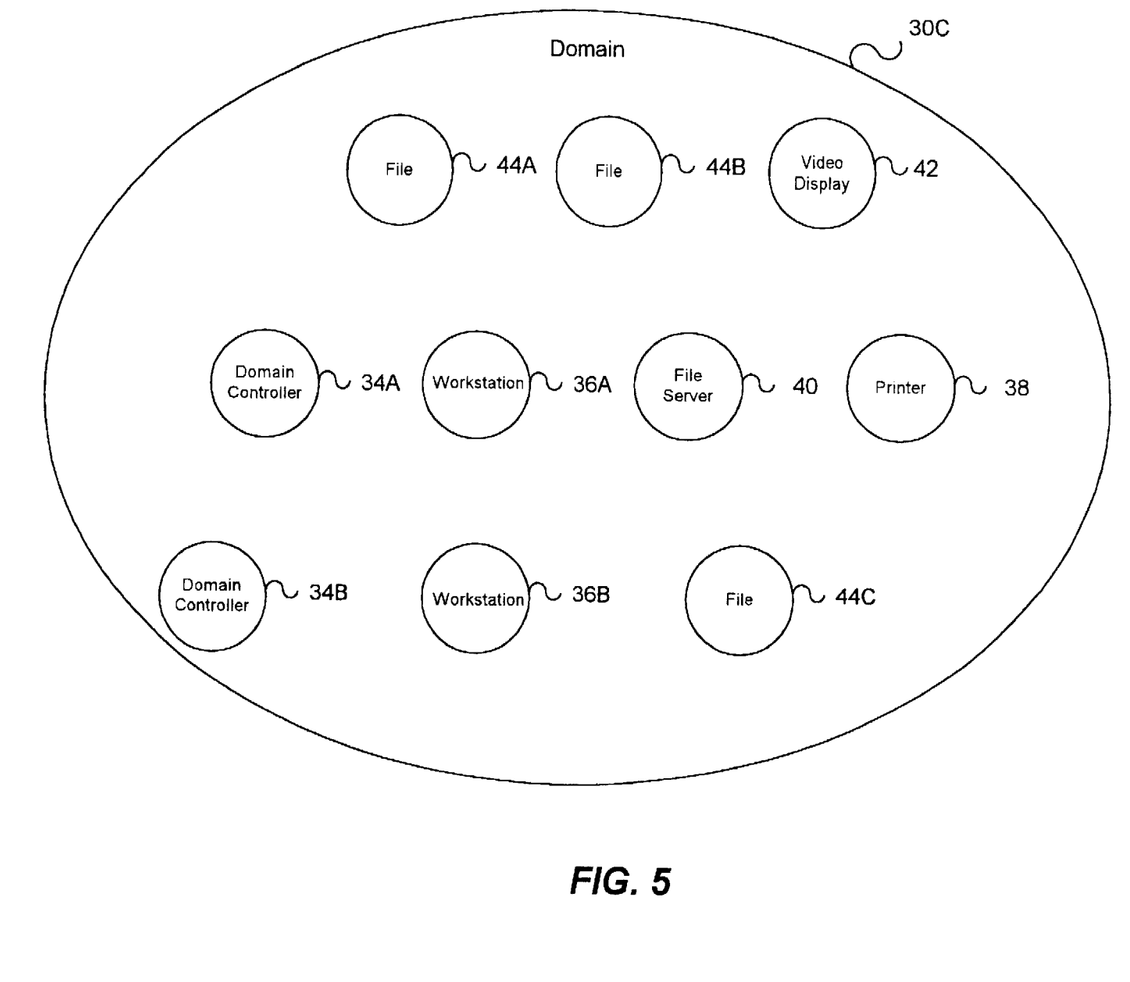
FIG. 5 is a block diagram of an illustrative domain of the distributed system of the preferred embodiment of the present invention.

FIG. 5 depicts what is included in domain 30C (FIG. 3) in more detail. FIG. 5 should not be confused with FIG. 4, which is intended to show the distributed name space 33. FIG. 5 shows the components included in a domain. The entities shown within domain 30C in FIG. 5 are merely illustrative and are not intended to imply that each domain must include these components. Each domain, however, includes at least one domain controller. Domain 30C includes two domain controllers: domain controller 34A and domain controller 34B. Two domain controllers are provided to enhance availability and to provide load balancing of domain controller resources. Each domain controller 34A and 34B is a distinguished machine. The role of the domain controllers 34A and 34B will be described in more detail below. Domain 30C also includes workstations 36A and 36B. A printer 38 is provided in the domain 30C along with the video display 42. Domain 30C also includes file server 40 and files 44A, 44B, and 44C.

Figure 6:
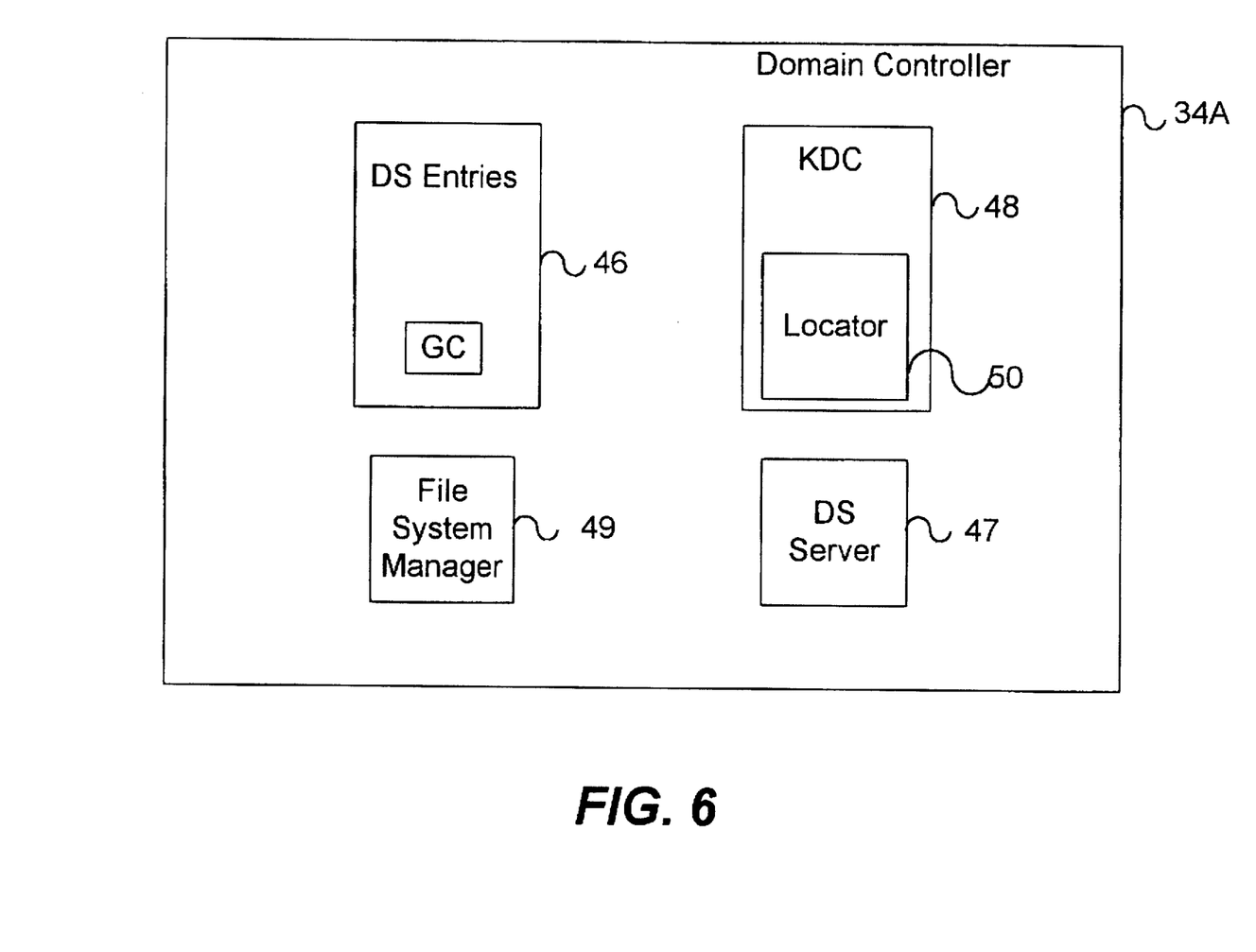
FIG. 6 is a more detailed block diagram of a domain controller of FIG. 5.

FIG. 6 is a block diagram showing several major functional components of domain controller 34A. Each domain controller will include these functional components as well as additional components. Domain controller 34A includes a collection of directory service entries 46. Each directory service entry is a separate object that holds property information. A global catalog (GC) 52 is provided in the DS entries 46. The GC 52 will be described in more detail below. A directory service (DS) server 47 is also provided in the domain controller 34A. The DS server 47 is responsible for mediating access to the directory service entries 46. A key distribution center (KDC) 48 is provided in the domain controller 34A and plays a role in maintaining security in the domain. A locator 50 for locating services and objects is included as part of the KDC 48. The role of the KDC 48 and the locator 50 will be described in more detail below. Lastly, a distributed file system manager 49 is provided in the domain controller 34A. It is responsible for managing the knowledge about the file system and various volumes in the domain.

The directory service entries 46 are objects like any other objects within the distributed system 10. Directory services entries 46 are available in two varieties. A first variety describes the structure of the distributed system 10 (FIG. 1). A directory service entry of this variety may, for example, specify where a group of objects are stored. A second variety of directory service entry describes a resource, such as a printer or the like. The second variety of directory service entry stores properties of the associated resource. Such resources may then be located by querying for the properties held in the associated directory service entries.

Figure 7:
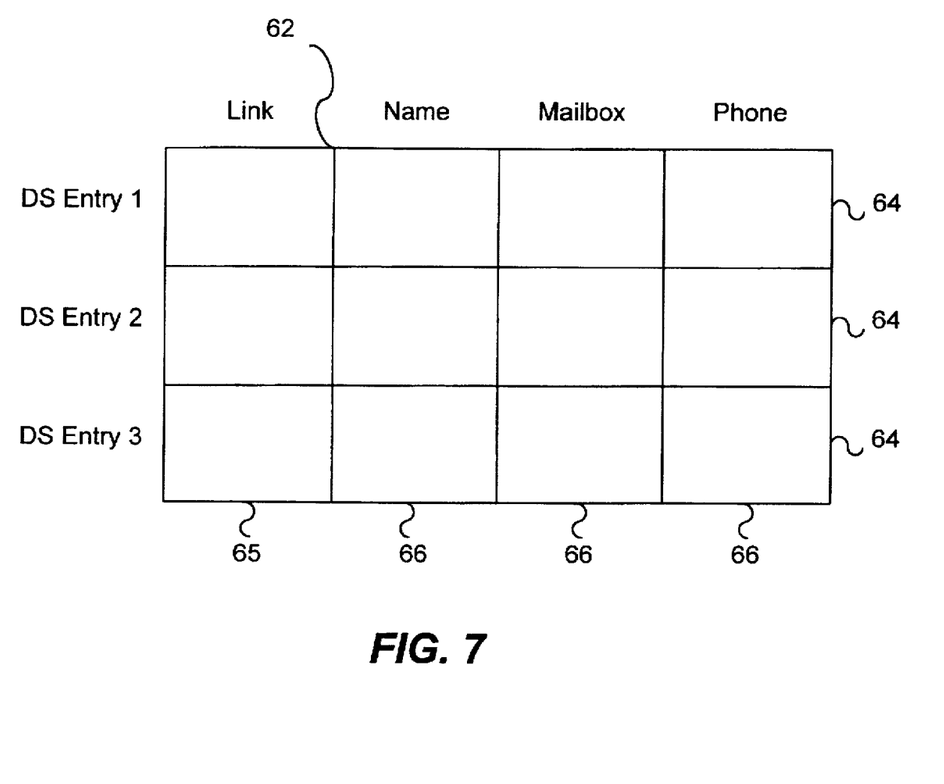
FIG. 7 is a more detailed diagram of a global catalog of FIG. 6.

As mentioned above, the directory service entries 46 include a GC 52. The GC 52 is created by copying the values of select properties stored in the directory service entries 46 and these are merged with similar collections in other domains using a replication facility like that described in co-pending application entitled "Replication Facility," which is assigned to a common assignee with the present application, and the contents of which are explicitly incorporated by reference herein. The GC 52 is a table (as shown in FIG. 7) wherein each row 64 represents a directory service entry (see DS entry 1, DS entry 2 and DS entry 3 in FIG. 7), and each column 66 represents a property of the associated directory service entry (such as "Name", "Mailbox" and "Phone" in FIG. 7). The GC 52 also includes a link 65 to the directory service entry from which the property information was obtained for the GC. The link to a directory service entry may be converted to a moniker to "bind" to the directory service entry. A moniker in this context is like that defined in the Microsoft Object Linking and Embedding, version 2.0, protocol established by Microsoft Corporation of Redmond, Washington. The GC is a special type of summary catalog. Summary catalogs are described in more detail in copending patent application entitled "Summary Catalogs, Ser. No. 08/181,899 " which is assigned to a common assignee with the present application. This copending application is explicitly incorporated by reference herein.

The GC 52 is shared among the domains of the distributed system 10 by replicating it across the domains. The GC 52 is organized to allow rapid searching or browsing of the directory service entries 46 that it lists. The GC 52 allows access to directory information without having to locate the directory service entries 46 that hold the desired information. The GC 52 provides a quick, low-cost alternative to directly searching the directory service entries.

The directory service entries 46 include entries that represent principals and services of the distributed system. A principal is an entity, such as a user, that can be granted access to objects or can make statements that affect access control decisions. Account information that includes passwords and credentials for users is also stored in the directory service entries 46. The object-oriented software system 28 (FIG. 2) adopts a client/server model wherein activities occur by clients requesting services from servers. The directory service entries 46 are responsible for implementing the directory service of the system. One of the primary roles of the directory entries 46 is to allow users and programs to find things (such as services) within the distributed system 10.

Figure 8:
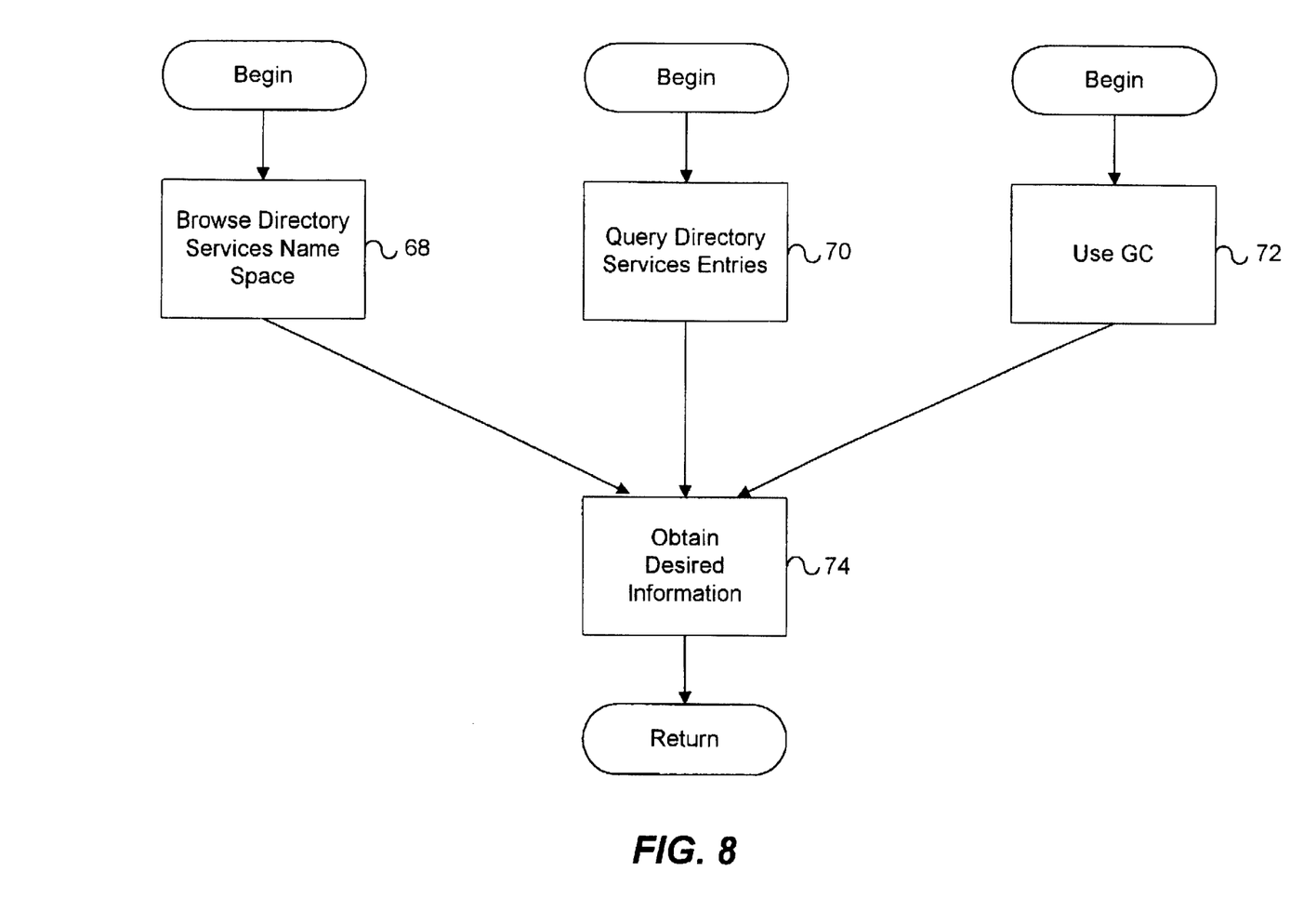
FIG. 8 is a flow chart illustrating steps performed to obtain directory service information in the preferred embodiment of the present invention.

FIG. 8 is a flow chart showing the alternatives of how a directory service entries (including a GC 52) may be utilized to help find things within the distributed system 10. The directory service entries 46 are stored at well-known locations within respective domain controllers of the distributed system 10. As such, users and programs know where to find the directory service entries 46 within the distributed name space 33 (FIG. 4) of the system. Accordingly, one approach to using the directory service entries 46 is to browse the distributed name space 33 for the directory service entries (step 68 in FIG. 8). Each of the directory service entries 46 is a separate object that has a name within the distributed name space 33. Such browsing allows a user or program to obtain the desired information (step 74 in FIG. 8).

Since the directory service entries are objects, they hold property information that may be directly queried. The object-oriented software system 28 (FIG. 2) supports a number of standardized interfaces that allow the querying of objects. Hence, a second alternative to finding things in the distributed system 10 using the directory service entries 46 is to directly query the directory service entries (step 70 in FIG. 8). The query returns property information that the user or program desires (step 74). Such queries may also be performed on other objects in the system.

Browsing by navigating the directory service name space or querying the directory service entries 46 may be a cumbersome task. For example, the distributed system 10 may include a large number of domains and visiting the name space for each domain may be time-consuming, expensive or impossible due to disconnectors and partitioning. As a result, it may often be more practical or even necessary to not directly use the directory service entries 46, but rather to utilize the GC 52. The GC 52 contains information about objects across all of the domains and is organized to support both querying and browsing. Thus, the third alternative is to use (i.e., to browse or query) the GC 52 (step 72) to obtain the desired information (step 74).

As mentioned in the above discussion, the preferred embodiment of the present invention provides a self-referential system wherein the directory service entries 46 are objects that are visible in the distributed name space 33, but also provide the information for constructing the distributed name space. Since the directory service entries 46 are objects, standardized operations such as querying may be performed on them. In addition, because the directory service entries 46 are encapsulated into objects, standardized APIs may be utilized to manipulate these objects. Thus, no duplication of APIs is necessary to provide separate tools for the file system and the directory service system. In addition, because the directory service entries are objects, they may have properties that allow them to be queried and to hold additional information that is useful. Still further, the same replication mechanism may be utilized to replicate directory service entries, including the GC 52, as is used to replicate all other objects. The directory service entries 46 are distinguished from other objects by class specific code that operates upon the directory service entries.

Given that the directory service entries 46 are located within the distributed name space, the question arises how the distributed name space is built during system initialization. The security system of the object-oriented software system 28 enables the location of the directory service entries 46 on system initialization so that the distributed name space may be built. In particular, the system boot routine includes a locator 50 like that shown in FIG. 5. This locator is utilized to locate directory service entries 46 throughout the distributed system 10.

Figure 9:
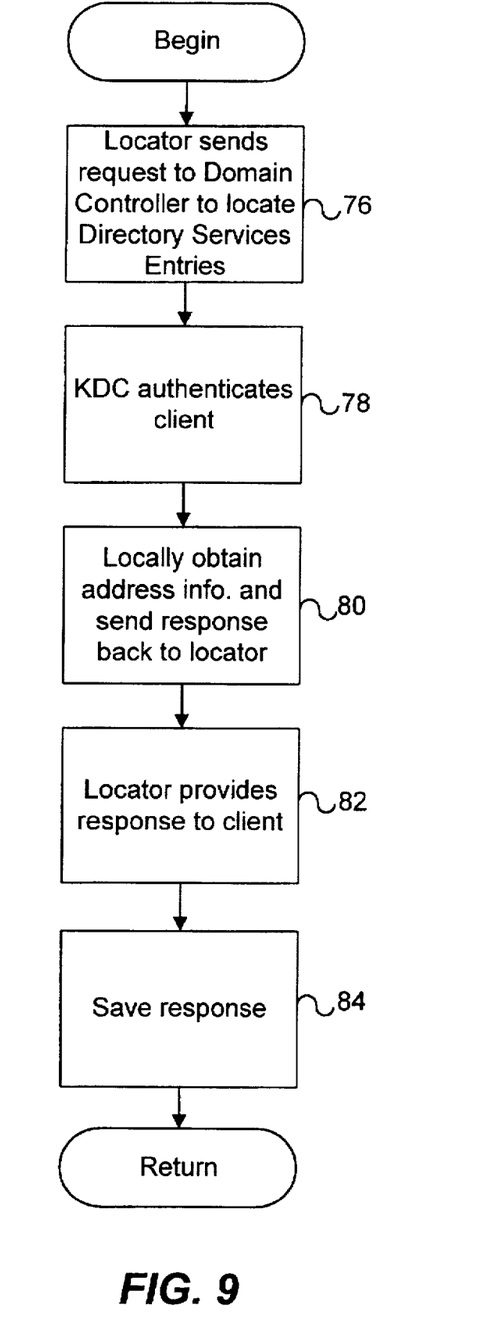
FIG. 9 is a flow chart illustrating the steps performed by the preferred embodiment of the present invention when directory services entries are located using a locator service.

FIG. 9 is a flow chart of the steps performed to locate the directory service entries 46. The steps shown in FIG. 9 may be performed not only during system initialization but at other points in time to locate directory service entries 46. For instance, the steps of FIG. 9 may be performed when the directory service information held at a local site has become stale and needs to be updated or when an administrator wants to locate the directory service entries 46.

Each client within the distributed system 10 includes a locator 50. Directory service entries are located on the domain controllers. The locator 50 uses a combination of broadcast and remote procedure call (RPC) protocols to locate the domain controller and, thus, clients can find the directory service entries (step 76). The request includes information indicating that the client knows a shared secret that is shared between the KDC 48 run on the domain controller and the client. Authentication of request is performed utilizing such shared secrets. Hence, in step 78, the KDC 48 of the domain controller authenticates the client. It is worth recalling from the above discussion that the directory services entries 46 hold authentication information for each account. Clients and the KDC 48 engage in an authentication protocol (e.g., Kerberos) that allows clients to demonstrate knowledge without revealing the shared secret. If the demonstrated knowledge of the shared secret is sufficient, a response is returned to the locator (step 80). The response provides sufficient addressing information for the KDC 48 so that the client may access the KDC and, thus, gain access to directory service entries 46. The locator 50 for the client then provides the received response to the client (step 82). The address information in the response is then stored for later use (step 84).

Another complication raised by unifying the directory service with the file system is the protection of directory service entries 46 from other types of objects. Protection of directory service entries in the preferred embodiment to the present invention is realized in at least two ways. First, only trusted machines may gain access to the directory service entries. As described above, relative to FIG. 8, a requesting party must demonstrate knowledge of the shared secret to gain access to directory service entries. Second, the requesting party does not obtain direct access to the storage of directory service entries; rather a remote agent (called via a remote procedure call) acts on behalf of the requesting party. The agent is remotely activated to act on the requesting party's behalf (i.e., all requests from clients are sent to this agent, which, in turn, accesses the real objects). As such, there is no way for the requesting party to damage the directory service entries or other protected information on the domain controller holding the directory service entries. Access control lists (ACLs) are used to control who (i.e., which clients) can access a directory service entry and for what purpose (e.g. read access, write access, etc.).

Figure 10:
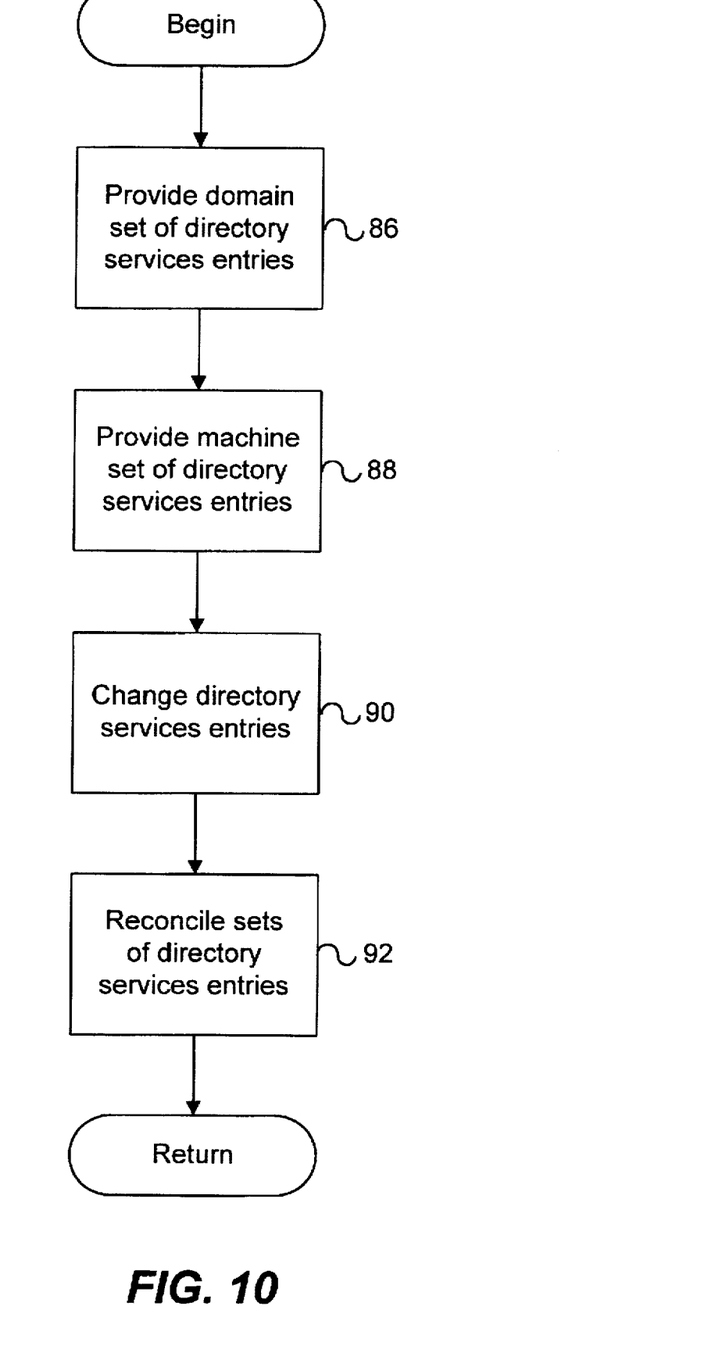
FIG. 10 is a flow chart illustrating the handling of a machine set of directory service objects and a domain set of directory service objects in the preferred embodiment of the present invention.

The distributed system 10 may include a number of separate machines like the workstation 36A depicted in FIG. 5. It is helpful to provide certain locally relevant directory services entries on each separate machine that allow the machine to run independently in absence of a network or domain controller. FIG. 10 is a flow chart illustrating the steps performed in the preferred embodiment of the present invention to maintain domain and machine sets of directory service entries. A complication that arises from having directory services entries on local machines is maintaining consistency between the domain set of directory service entries and machine sets of directory service entries. A domain set of directory service entries are provided for the domain that includes a machine (step 86). A machine set of directory service entries is also provided for the machine (step 88). The machine set of directory service entries are name transparent replicants of the domain directory service entries and are particular to the machine. The structure of the machine set of directory service entries reflects that of the structure of the domain set of directory service entries. The machine set of directory service entries hold all data that is necessary for the machine to boot and work at a stand-alone or disconnected environment. One difficulty in maintaining two similar sets of directory service entries is how to maintain consistencies between the sets of directory service entries. In the preferred embodiment of the present invention, when one of the sets of directory service entries changes (step 90), the sets of directory service entries must be reconciled (step 92). The reconciliation is performed by the replication mechanism of the object-oriented software system 28. A suitable replication mechanism is described in the copending application entitled, "Replication Facility," Ser. No. 08/181,704, now U.S. Pat. No. 5,588,147, which is assigned to a common assignee with the present invention and the contents of which are explicitly incorporated by reference herein. The replication facility makes the changes that have been made to one of the sets of directory service entries to the other set of directory service entries.

While the present invention has been described with reference to a preferred embodiment thereof, those skilled in the art will appreciate that various changes in scope and detail may be made without departing from the present invention as defined in the appended claims. For instance, the present invention need not be implemented in an operating system; rather, the present invention may be implemented in a graphical user interface or in other code that is separate from the operating system. Moreover, as mentioned above, the present invention need not be implemented in an object-oriented environment.

We claim:

1. In a distributed system having components including at least one storage device and at least one computer system, a distributed file system for storing files in file system structures and a distributed name space of names of the file system structures in which each distinct name may refer to only one file system structure, a method comprising the steps of:

storing files in the storage device in the file system structures;

storing directory entries in the storage device in the file system structures that store the files such that the directory entries have names in the distributed name space, at least some of said directory entries holding information regarding how to locate the file system structures in the distributed system; and accessing a first of the file system structures in the storage device that stores at least one directory entry to locate a second of the file system structures using the information stored in the first file system structure.

2. The method recited in claim 1, further comprising the step of storing an operating system in the storage device that includes code for accessing the file system structures stored in the storage device and wherein the step of accessing the first of the file system structures in the storage device that stores at least one directory entry further comprises the step of executing the code, for accessing the file system structures stored in the storage device, on the distributed system to access the first of the file system structures stored in the storage device that stores at least one directory entry to locate the second of the file system structures using the information stored in the first file system structure.

3. The method recited in claim 2, further comprising the step of executing the code included in the operating system for accessing the file system structures stored in the storage device on the distributed system to access one of the file system structures that stores a file.

4. A distributed system comprising:

a processor;

a distributed set of storage devices;

a distributed file system for storing files in file system structures in the set of storage devices;

means for providing a distributed name space naming file system structures such that each distinct name may refer to only one file system structure; and means for storing directory service entries, that describe the structure of the distributed file system, in the same file system structures as are used to store files in the set of storage devices such that the directory entries are named by the distributed name space.

5. The distributed system recited in claim 4 wherein the means for storing files stores files as objects in the storage device and the means for storing directory service entries stores the directory service entries in objects in the storage device.

6. In a distributed system having resources that are logically partitioned into domains including a first and second domain, each domain including at least one computer system, a method comprising the steps of:

(a) storing at least one set of directory service entries in a selected computer system in each domain;

(b) storing a file in a computer system of the second domain other than the selected computer system;

(c) generating a request from the first domain to access directory service entries in the second domain;

(d) in response to step (c), generating a request from a computer system in the first domain to access the file stored in the second domain;

(e) in response to step (d), accessing the directory service entries on the selected machine in the second domain; and (f) accessing the file stored on a computer of the second domain other than the selected computer system using information obtained by accessing the directory service entries on the selected machine in the second domain.

7. The method recited in claim 6 wherein the step of accessing the directory service entries in the second domain further comprises the step of accessing the directory service entries in the second domain with an agent at the second domain that acts on behalf of the first domain.

8. In a distributed system having hardware components that include at least one storage device and processors that run processes, a method comprising the steps of:

storing files in the storage device;

storing names of the stored files in the storage devices to create a distributed name space so that the stored files are visible to the processes and so that each distinct name may refer to only one stored file;

logically partitioning the names of the stored files in the distributed name space into groups of files;

for each group of files, storing in the storage device a set of associated directory service entries as files, the directory service entries describing locations of the stored files; and for each group of files, adding names of the associated directory service entries to the group in the distributed name space that is stored in the storage device.

9. The method recited in claim 8 wherein the step of storing in the storage device for each group of files a set of associated directory service entries as files further comprises the step of storing in the storage device, for each group of files, a set of associated directory service entries as objects.

10. The method recited in claim 8, further comprising the step of locating one of the directory service entries in one of the processes to obtain directory service information held therein.

11. The method recited in claim 8 wherein the step of storing in the storage devices the set of associated directory service entries for each group further comprises the step of storing security entries in the storage device in the storage as directory service entries for each group, said security entries providing security information for entries in the group.

12. The method recited in claim 8 wherein the step of storing files in the storage device further comprises the step of storing at least one file in the storage device that models one of the hardware components.

13. The method recited in claim 12 wherein the step of storing files in the storage device further comprises the step of storing at least one file in the storage device that holds instructions for one of the processes.

14. In a distributed system having a plurality of data processing systems, wherein each data processing system includes a storage device and other resources, a method comprising the steps of:

storing in at least one of the storage devices a tree-structured distributed name space for files in the distributed system, the distributed name space being logically partitioned into domains, each domain comprising a subtree of the distributed name space;

storing in at least one of the storage devices a domain set of directory service entries for each domain, the directory service entries holding information describing the subtree of the distributed name space of the domain and resources in the domain;

storing in the storage device of a selected data processing system a local set of directory service entries for the selected one of the data processing systems, the local set of directory service entries including at least a portion of the domain set of directory service entries;

using the local set of directory service entries to obtain directory information at the selected one of the data processing systems; and locally making changes to the local set of directory service entries at the selected one of the data processing systems.

15. The method recited in claim 14, further comprising the step of reconciling the domain set of directory service entries with the local set of directory service entries so that the domain set of directory service entries includes the changes that have been made to the local set of directory service entries.

16. The method recited in claim 14 wherein the step of storing in at least one of the storage devices the domain set of directory service entries for each domain further comprising the step of storing in at least one of the storage devices the domain set of directory service entries as objects for each domain.

17. The method recited in claim 14 wherein the step of storing in the storage device of the selected data processing system the local set of directory service entries further comprises the step of storing in the storage device of the selected data processing system the local set of directory service entries as objects.

18. A computer-readable medium whose contents cause a computer system in a distributed system having components including a storage device to provide a distributed file system for storing files in file system structures and a distributed name space of names of the file system structures in which each distinct name may refer to only one file system structure by performing the steps of:

storing files in the storage device in the file system structures;

storing directory entries in the storage device in the file system structures that store the files such that the directory entries have names in the distributed name space, at least some of said directory entries holding information regarding how to locate the file system structures in the distributed system; and accessing a first of the file system structures in the storage device that stores at least one directory entry to locate a second of the file system structures using the information stored in the first file system structure.

19. The computer-readable medium recited in claim 18 wherein the contents of the computer-readable medium further cause the computer system to perform the step of storing an operating system in the storage device that includes code for accessing the file system structures stored in the storage device, and wherein the step of accessing the first of the file system structures in the storage device that stores at least one directory entry further comprises the step of executing the code, for accessing the file system structures stored in the storage device, on the distributed system to access the first of the file system structures stored in the storage device that stores at least one directory entry to locate the second of the file system structures using the information stored in the first file system structure.

20. The computer-readable medium recited in claim 19 wherein the contents of the computer-readable medium further cause the computer system to perform the step of executing the code included in the operating system for accessing the file system structures stored in the storage device on the distributed system to access one of the file system structures that stores a file.

* * * * *